United States Patent
Fu (10) Patent No.: US 12,542,644 B2
(45) Date of Patent: Feb. 3, 2026

(54) UPLINK CONTROL INFORMATION MULTIPLEXING METHOD AND APPARATUS

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 306 days.

(21) Appl. No.: 18/554,879

(22) PCT Filed: Apr. 12, 2021

(86) PCT No.: PCT/CN2021/086735
§ 371 (c)(1),
(2) Date: Oct. 11, 2023

(87) PCT Pub. No.: WO2022/217448
PCT Pub. Date: Oct. 20, 2022

(65) Prior Publication Data
US 2024/0380558 A1    Nov. 14, 2024

(51) Int. Cl.
*H04W 72/21* (2023.01)
*H04L 5/00* (2006.01)
*H04W 72/1268* (2023.01)

(52) U.S. Cl.
CPC ....... *H04L 5/0055* (2013.01); *H04W 72/1268* (2013.01); *H04W 72/21* (2023.01)

(58) Field of Classification Search
CPC .................................................. H04W 72/51
USPC ........................................................ 370/329
See application file for complete search history.

(56) References Cited

U.S. PATENT DOCUMENTS

2021/0100024 A1    4/2021   Bang et al.

FOREIGN PATENT DOCUMENTS

| CN | 111836310 A | 10/2020 |
| WO | WO 2020223658 A1 | 11/2020 |
| WO | WO 2020226549 A1 | 11/2020 |
| WO | 2021015534 A1 | 1/2021 |

OTHER PUBLICATIONS

Examination report for India Application No. 202347076621, dated Apr. 28, 2025, 7 pages.
Extended European Search Report Issued in Application No. 21936343.9 dated Apr. 29, 2024, 9 pages.

(Continued)

*Primary Examiner* — Angel T Brockman
(74) *Attorney, Agent, or Firm* — Finnegan, Henderson, Farabow, Garrett & Dunner, L.L.P.

(57) ABSTRACT

A method for multiplexing uplink control information (UCI) for unlicensed band transmission, is performed by a terminal device. The method includes: in response to a time-domain overlap between a configure grant-physical uplink share channel (CG-PUSCH) and a hybrid automatic repeat request acknowledgement (HARQ-ACK) carried on a physical uplink control channel (PUCCH), determining, based on a priority of the CG-PUSCH and a priority of the HARQ-ACK, a multiplexing mode for CG-UCI carried on the CG-PUSCH and the HARQ-ACK; and transmitting information to a network device based on the multiplexing mode, wherein the information transmitted includes at least one of the CG-UCI or the HARQ-ACK.

17 Claims, 6 Drawing Sheets

---

S301: determining there is a time-domain overlap between CG-PUSCH and HARQ-ACK carried on a PUCCH S302: in response to the priority of the CG-PUSCH being different from the priority of the HARQ-ACK, determining a mode of transmitting information with a high priority and discarding or performing delay transmission on information with a low priority as the multiplexing mode S303: transmitting information to a network device based on the multiplexing mode, wherein the information transmitted comprises the CG-UCI and/or the HARQ-ACK (56) References Cited

OTHER PUBLICATIONS

"Discussion on Intra-UE multiplexing/prioritization", LG Electronics, 3GPP TSG RAN WG1 #104-e, R1-2100883, e-Meeting, Jan. 25-Feb. 5, 2021, 14 pages.
International Search Report and Written Opinion of International Application No. PCT/CN2021/086735, dated Jan. 17, 2022, 19 pages.
ZTE, Sanechips, "Remaining issues on configured grant for NR-U", 3GPP TSG RAN WG1 Meeting #99, R1-1911825, Reno, USA, Nov. 18-22, 2019, 8 pages.

UPLINK CONTROL INFORMATION MULTIPLEXING METHOD AND APPARATUS

CROSS-REFERENCE TO RELATED APPLICATION

This application is the U.S. national application of International Application No. PCT/CN2021/086735, filed on Apr. 12, 2021, the entire contents of which are incorporated herein by reference.

TECHNICAL FIELD

The disclosure relates to a field of communication technologies, and specifically to a method and an apparatus for multiplexing uplink control information (UCI).

BACKGROUND

Ultra reliable and low latency communication (URLLC) services have high requirements for transmission reliability. In order to achieve the enhancement of the URLLC services on unlicensed bands, it is necessary to implement transmission of a configure grant-physical uplink share channel (CG-PUSCH) on the unlicensed bands.

SUMMARY

In a first aspect of the disclosure, a method for multiplexing uplink control information (UCI) is provided, which is applied to a terminal device. The method includes: in response to a time-domain overlap between a configure grant-physical uplink share channel (CG-PUSCH) and a hybrid automatic repeat request acknowledgement (HARQ-ACK) carried on a physical uplink control channel (PUCCH), determining, based on a priority of the CG-PUSCH and a priority of the HARQ-ACK, a multiplexing mode for CG-UCI carried on the CG-PUSCH and the HARQ-ACK; and transmitting information to a network device based on the multiplexing mode, in which the information transmitted includes at least one of the CG-UCI or the HARQ-ACK.

In a second aspect of the disclosure, a method for multiplexing UCI is provided, performed by a network device. The method includes: sending a multiplexing indication parameter to a terminal device, in which the multiplexing indication parameter indicates the terminal device to determine a multiplexing mode based on at least one of: a state of the multiplexing indication parameter, or a priority of CG-UCI carried on a CG-PUSCH and a priority of a HARQ-ACK, in response to a time-domain overlap between the CG-PUSCH and the HARQ-ACK, in which the state includes an enable state and an unenable state; and receiving information transmitted by the terminal device based on the multiplexing mode determined, in which the information transmitted includes at least one of the CG-UCI or the HARQ-ACK.

In a third aspect of the disclosure, a terminal device is provided, including: a processor and a memory for storing a computer program. When the computer program is executed by the processor, the terminal device is caused to execute the method as described in the first aspect.

BRIEF DESCRIPTION OF THE DRAWINGS

The accompanying drawings are briefly described below.

DETAILED DESCRIPTION

The embodiments of the disclosure are described in detail below, examples of which are illustrated in the accompanying drawings, throughout which the same or similar reference numerals refer to the same or similar elements. The embodiments described below with reference to the accompanying drawings are exemplary, intended to explain the disclosure and are not to be construed as limitations of the disclosure.

For ease of understanding, the terms involved in this disclosure is first introduced.

1. Uplink Control Information (UCI).

UCI contains information related to states of a current terminal device, such as whether the current terminal device needs to request uplink resources, a downlink (DL) quality detected by the current terminal device, a number of transmission layers that the current terminal device may distinguish, and other information.

2. Radio Resource Control (RRC)

RRC, also known as Radio Resource Management (RRM) or Radio Resource Allocation (RRA), refers to management, control and scheduling of radio resources through a certain strategy and means, makes full use of limited wireless network resources as much as possible while meeting the requirements of service quality, ensures to reach a planned coverage area and improves service capacity and resource utilization as much as possible.

3. Physical Uplink Control Channel (PUCCH)

PUCCH is used by the terminal device to send information related to uplink scheduling to the base station, such as scheduling requests, channel state information, etc.

4. Physical Uplink Shared Channel (PUSCH)

PUSCH is used to carry uplink services and upper layer signaling data related to a long-term evolution user. As a main uplink data carrying channel of the physical layer, it may schedule and transmit uplink data and may also carry control information.

5. Hybrid Automatic Repeat reQuest acknowledgement (HARQ-ACK)

HARQ combines forward error correction (FEC) with automatic repeat-request (ARQ), which is called the hybrid automatic repeat request. HARQ-ACK is a response or a feedback information of the HARQ.

In order to better understand the method for multiplexing UCI proposed in the embodiment of the disclosure, the communication system used in the embodiment of the disclosure is first described below.

Figure 1:
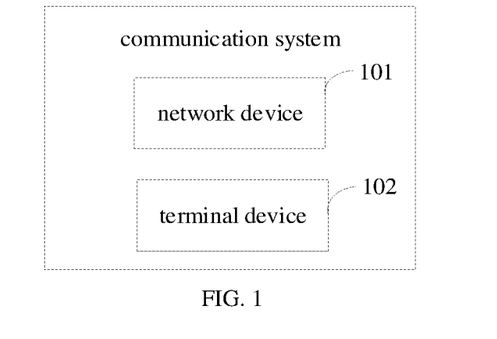
FIG. 1 is a schematic diagram of a communication system proposed in an embodiment of the disclosure.

As shown in FIG. 1, it is a schematic diagram of a communication system proposed in an embodiment of the disclosure. The communication system may include but is not limited to a network device and a terminal device. The number of devices and a device form shown in FIG. 1 are only for examples and do not constitute a limitation on the embodiments of the disclosure. In actual applications, the system may include two or more network devices, and two or more terminal devices. The communication system shown in FIG. 1 includes one network device 101 and one terminal device 102 as an example.

It should be noted that the technical solutions of the embodiments of the disclosure may be applied to various communication systems, for example, a long term evolution (LTE) system, a 5th generation (5G) mobile communication system, a 5G new radio (NR) system, or other future new mobile communication systems.

The network device 101 in the embodiment of the disclosure is an entity on the network side that is used to transmit or receive signals. For example, the network device 101 may be an evolved NodeB (eNB), a transmission reception point (TRP), a next generation NodeB (gNB) in an NR system, or other base station in future mobile communication systems, or access nodes in wireless fidelity (WiFi) systems, etc. The specific technology and specific device form used by the network device are not limited in the embodiments of the disclosure. The network device provided in the embodiment of the disclosure may be composed of a centralized unit (CU) and a distributed unit (DU). The CU may also be called a control unit. By using a structure of CU-DU, protocol layers of the network device (e.g., base station) may be separated, i.e., a part of protocol layer functions are placed on the CU for centralized control, and the remaining part or all the protocol layer functions are distributed in the DU and the CU centrally controls the DU.

The terminal device 102 in the embodiment of the disclosure is an entity on a user side that is used to receive or transmit signals, such as a mobile phone. The terminal device may also be called a terminal, a user equipment (UE), a mobile station (MS), a mobile terminal (MT), etc. The terminal device may be a car with communication functions, a smart car, a mobile phone, a wearable device, a tablet (Pad), a computer with wireless transceiver functions, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The specific technology and specific device form used by the terminal device are not limited in the embodiments of the disclosure.

It may be understood that the communication system described in the embodiments of the disclosure is to more clearly illustrate the technical solutions of the embodiments of the disclosure, and does not constitute a limitation on the technical solutions proposed in the embodiments of the disclosure. Those of ordinary skill in the art may be known that, with the evolution of system architecture and the emergence of new service scenarios, the technical solutions proposed in the embodiments of the disclosure are also applicable to similar technical problems.

It may be understood that a plurality of solutions in the embodiments of the disclosure may be implemented individually or in combination, which is not limited in the disclosure.

A method and an apparatus for multiplexing UCI proposed in the disclosure may be introduced in detail below with reference to the accompanying drawings.

Figure 2:
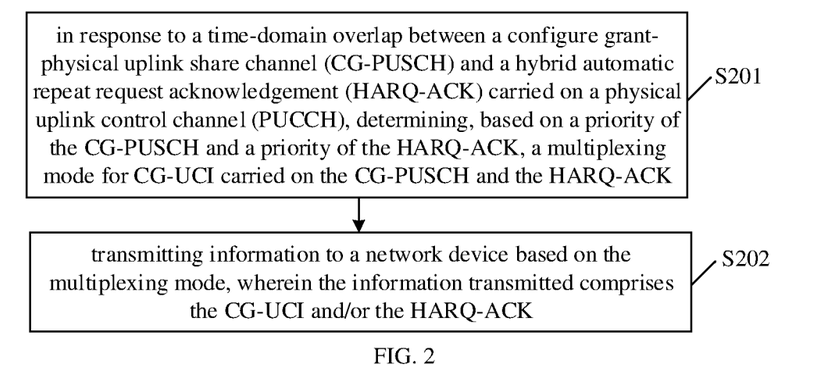
FIG. 2 is a flowchart of a method for multiplexing uplink control information (UCI) according to an embodiment of the disclosure.

FIG. 2 is a flowchart of a method for multiplexing UCI according to an embodiment of the disclosure. The method is applied to a terminal device. As shown in FIG. 2, the method includes the following steps.

At S201, in response to a time-domain overlap between a configure grant-physical uplink share channel (CG-PUSCH) and a hybrid automatic repeat request acknowledgement (HARQ-ACK) carried on a physical uplink control channel (PUCCH), a multiplexing mode for CG-UCI carried on the CG-PUSCH and the HARQ-ACK is determined based on a priority of the CG-PUSCH and a priority of the HARQ-ACK.

The terminal device transmits uplink information or data with the network device through physical uplink channels. The physical uplink channels include PUCCH and PUSCH. In the implementation, the terminal device may carry the UCI in the PUCCH for transmission, or may carry the UCI in the PUSCH for transmission.

In some implementations, the UCI may include HARQ-ACK and/or configure grant-uplink control information (CG-UCI). Optionally, the HARQ-ACK may be transmitted to the network device through the PUCCH, and the CG-UCI may be transmitted to the network device through the CG-PUSCH. The CG-PUSCH is a periodic time-frequency resource configured by the network device for terminals through a high layer signaling, and may be used to transmit uplink data. The high layer signaling is an RRC signaling or other signaling, which is not limited here. In a New Radio Unlicensed (NRU), both the PUCCH and the CG-PUSCH may work in an unlicensed band. When both the PUCCH and the CG-PUSCH work in the unlicensed band, a time-domain overlap between the CG-PUSCH and the PUCCH may occur.

When the CG-PUSCH is transmitted in an unlicensed band, the CG-PUSCH may carry the CG-UCI information to indicate uplink control information related to this CG-PUSCH transmission. Optionally, the CG-UCI information may include a HARQ-identity document (HARQ-ID), a new data indication (NDI), a channel occupation time sharing information (COT sharing information), etc.

In the implementation, the network device may also directly configure a priority of CG-PUSCH through a high-layer signaling. Generally speaking, it may be considered that if the network device schedules URLLC services to be transmitted on the CG-PUSCH, it may generally configure the CG-PUSCH with a high priority.

When the CG-UCI carried on the CG-PUSCH overlaps with the HARQ-ACK carried on the PUCCH in the time domain, there are different multiplexing modes for the CG-UCI carried on the CG-PUSCH and the HARQ-ACK according to different priorities of the CG-PUSCH and the HARQ-ACK, so the most appropriate multiplexing mode is determined to facilitate good information transmission.

Optionally, the multiplexing mode may be a mode of joint encoding the CG-UCI and the HARQ-ACK.

Optionally, the multiplexing mode may be a mode of transmitting one of the CG-UCI and the HARQ-ACK. For example, the CG-UCI may be transmitted while the HARQ-ACK may be discarded or delay transmission on the HARQ-ACK may be performed. For another example, the HARQ-ACK may be transmitted while the CG-UCI is discarded or delay transmission on the CG-UCI is performed.

At S202, information is transmitted to a network device based on the multiplexing mode, in which the information transmitted includes the CG-UCI and/or the HARQ-ACK.

Different multiplexing modes in the implementation may transmit different information. Correspondingly, channels for transmitting this information may be different. Therefore, a corresponding transmission channel may be determined based on the multiplexing mode determined above, and then the information corresponding to the multiplexing mode is transmitted to the network device based on the transmission channel.

As a possible implementation, in response to the multiplexing mode being to jointly encode the CG-UCI and the HARQ-ACK, the transmission channel may be determined to be the CG-PUSCH. The CG-PUSCH carries information after jointly encoding the CG-UCI and HARQ-ACK, and the jointly encoded information is transmitted to the network device.

As another possible implementation, in response to the multiplexing mode being to transmit only CG-UCI, the transmission channel may be determined to be CG-PUSCH. The CG-UCI is carried in the CG-PUSCH, and the CG-UCI is transmitted to the network device.

As another possible implementation, in response to the multiplexing mode being to transmit only HARQ-ACK, the transmission channel may be determined to be PUCCH. The HARQ-ACK is carried in the PUCCH, and the HARQ-ACK is transmitted to the network device.

In the method for multiplexing UCI according to the embodiment of the disclosure, in response to the time domain overlap between the CG-PUSCH and the HARQ-ACK carried on the PUCCH, the multiplexing mode for CG-UCI carried on the CG-PUSCH and the HARQ-ACK may be determined based on the priority of the CG-PUSCH and the priority of the HARQ-ACK, the CG-UCI and/or HARQ-ACK are transmitted to the network device based on the multiplexing mode. The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, which may thus ensure the transmission delay and reliability of UCI in the URLLC services.

Figure 3:
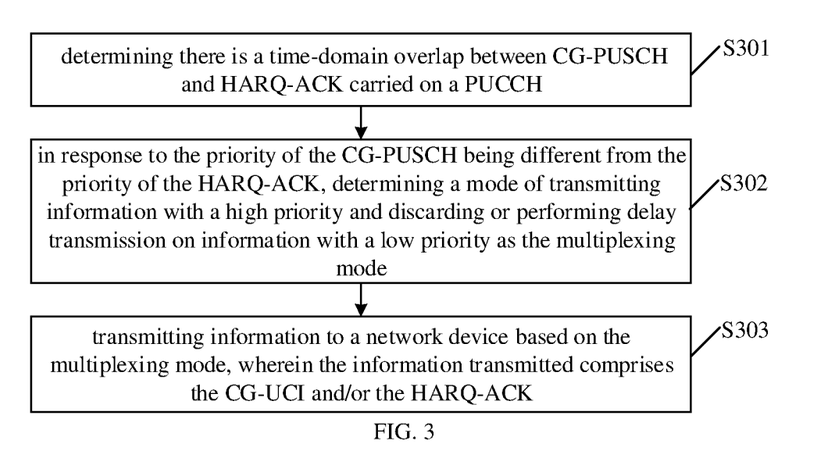
FIG. 3 is a flowchart of a method for multiplexing UCI according to another embodiment of the disclosure.

FIG. 3 is a flowchart of a method for multiplexing UCI according to an embodiment of the disclosure. The method is applied to a terminal device. As shown in FIG. 3, the method also includes the following steps.

At S301, it is determined that there is a time-domain overlap between CG-PUSCH and HARQ-ACK carried on a PUCCH.

Regarding the specific implementation of step S301, the implementation in any embodiment of the disclosure may be adopted, which may not be described again here.

At S302, in response to the priority of the CG-PUSCH being different from the priority of the HARQ-ACK, a mode of transmitting information with a high priority and discarding or performing delay transmission on information with a low priority is determined as the multiplexing mode.

In the embodiment of the disclosure, the priority of the CG-UCI may be considered to be equal to a priority of the CG-PUSCH that transmits the CG-UCI.

Optionally, the priorities of CG-UCI and HARQ-ACK include any of:

The priority of CG-UCI is equal to the priority of HARQ-ACK;

The priority of CG-UCI is higher than the priority of HARQ-ACK; or

The priority of HARQ-ACK is higher than the priority of CG-UCI.

When the priority of CG-PUSCH is different from that of HARQ-ACK, if the priority of CG-UCI is higher than that of HARQ-ACK optionally, CG-UCI and HARQ-ACK cannot be transmitted at the same time since there is an overlap in the transmissions of the CG-UCI and HARQ-ACK, in order to ensure that high-priority information may be transmitted preferentially, optionally, lower-priority HARQ-ACK may be discarded and only high-priority CG-UCI may be transmitted. Optionally, delay transmission of the lower-priority HARQ-ACK may be performed and the high-priority CG-UCI may be transmitted preferentially.

Optionally, if the priority of HARQ-ACK is higher than that of CG-UCI, CG-UCI and HARQ-ACK cannot be transmitted at the same time since there is an overlap in the transmissions of the CG-UCI and HARQ-ACK, in order to ensure that high-priority information may be transmitted preferentially, optionally, lower-priority CG-UCI may be discarded and only high-priority HARQ-ACK may be transmitted. Optionally, delay transmission of the lower-priority CG-UCI may be performed and the high-priority HARQ-ACK may be transmitted preferentially.

At S303, information is transmitted to a network device based on the multiplexing mode, in which the information transmitted includes the CG-UCI and/or the HARQ-ACK.

Regarding the specific implementation of step S303, the implementation in any embodiment of the disclosure may be adopted, which may not be described again here.

When the embodiment of the disclosure is applied to the unlicensed band transmission, when the priorities of CG-PUSCH and HARQ-ACK are different, it may ensure that information with high priority is transmitted preferentially.

Figure 4:
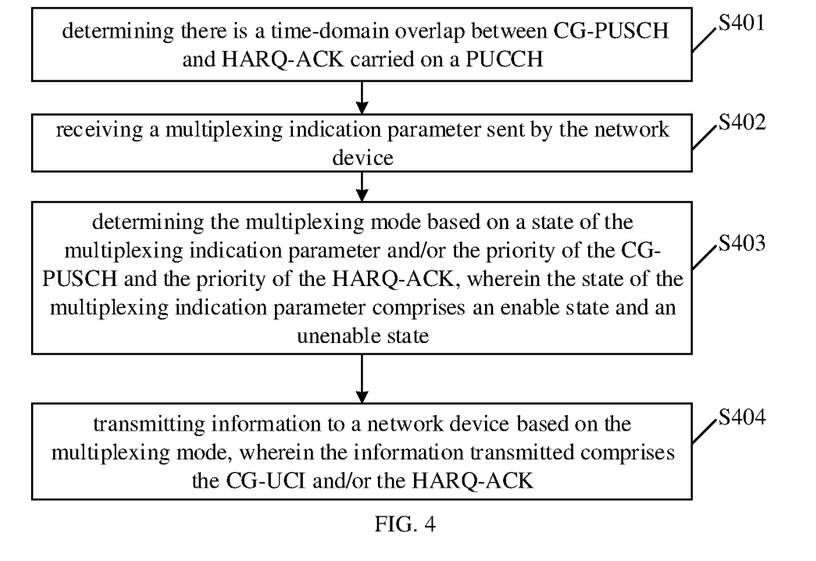
FIG. 4 is a flowchart of a method for multiplexing UCI according to another embodiment of the disclosure.

FIG. 4 is a schematic flowchart of a method for multiplexing UCI according to an embodiment of the disclosure. The method is applied to a terminal device. As shown in FIG. 4, the method also includes the following steps.

At S401, it is determined that there is a time-domain overlap between CG-PUSCH and HARQ-ACK carried on a PUCCH.

Regarding the specific implementation of step 401, the implementation in any embodiment of the disclosure may be adopted, which may not be described again here.

At S402, a multiplexing indication parameter sent by the network device is received.

The multiplexing indication parameter is used to indicate whether to allow CG-UCI and HARQ-ACK with different priorities to be multiplexed. If the multiplexing indication parameter is configured in an enable state, the configuration allows CG-UCI and HARQ-ACK with different priorities to be multiplexed, CG-UCI and HARQ-ACK with the same priorities or different priorities are jointly encoded and carried on the CG-PUSCH. If the multiplexing indication parameter is configured in an unenable/disable state, the configuration does not allow CG-UCI and HARQ-ACK with different priorities to be multiplexed, one with high priority is transmitted preferentially among the CG-UCI and HARQ-ACK with different priorities.

The terminal device may receive a high layer signaling sent by the network device, through which the multiplexing indication parameter is sent to the terminal device. In some implementations, an existing parameter in the high layer signaling is used as the multiplexing indication parameter. In other implementations, a new parameter may be added in the high layer signaling as the multiplexing indication parameter. In some implementations, two parameters and a combination of two parameters in the high layer signaling are used as multiplexing indication parameters, which may be for example, existing parameters or new parameters, or a part of which may be existing parameters and a part of which may be new parameters.

For example, the high-layer signaling may be an RRC signaling, and a configure grant-uplink control information multiplexing (CG-UCI Multiplexing) parameter in the RRC signaling may be used as the multiplexing indication parameter.

At S403, the multiplexing mode is determined based on a state of the multiplexing indication parameter and/or the priority of the CG-PUSCH and the priority of the HARQ-ACK. The state of the multiplexing indication parameter includes an enable state and an unenable state.

The state of the multiplexing indication parameter includes the enable state and the unenable state. The multiplexing mode is determined according to the state of the multiplexing indication parameter and/or the priorities of CG-PUSCH and HARQ-ACK.

Optionally, the priorities of CG-UCI and HARQ-ACK include any of:
The priority of CG-UCI is equal to the priority of HARQ-ACK;
The priority of CG-UCI is higher than the priority of HARQ-ACK; or
The priority of HARQ-ACK is higher than the priority of CG-UCI.

That is to say, by combining the state of the multiplexing indication parameter and the priorities, there are a total of 6 combination situations, including any of:
The multiplexing indication parameter is in the enable state, and the priority of CG-UCI is equal to the priority of HARQ-ACK;
The multiplexing indication parameter is in the enable state, and the priority of CG-UCI is higher than the priority of HARQ-ACK;
The multiplexing indication parameter is in the enable state, and the priority of HARQ-ACK is higher than the priority of CG-UCI;
The multiplexing indication parameter is in the unenable state, and the priority of CG-UCI is equal to the priority of HARQ-ACK;
The multiplexing indication parameter is in the unenable state, and the priority of CG-UCI is higher than the priority of HARQ-ACK; or
The multiplexing indication parameter is in the unenable state, and the priority of HARQ-ACK is higher than the priority of CG-UCI.

It should be noted that each combination situation has its corresponding multiplexing mode. According to the combination situation of CG-PUSCH and HARQ-ACK, the multiplexing mode may be determined accordingly.

In the embodiment of the disclosure, transmitting CG-UCI and/or HARQ-ACK on CG-PUSCH resources may be instructed by the network device, may be agreed by a protocol, or may be independently selected by the terminal, which is not further limited here.

At S404, information is transmitted to a network device based on the multiplexing mode, in which the information transmitted includes the CG-UCI and/or the HARQ-ACK.

Regarding the specific implementation of step S404, the implementation in any embodiment of the disclosure may be adopted, which may not be described again here.

The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, and the appropriate multiplexing mode may be determined based on the multiplexing indication parameter and/or the priority of CG-PUSCH and the priority of HARQ-ACK carried on the PUCCH, which may thus ensure the transmission delay and reliability of UCI in the URLLC services.

Figure 5:
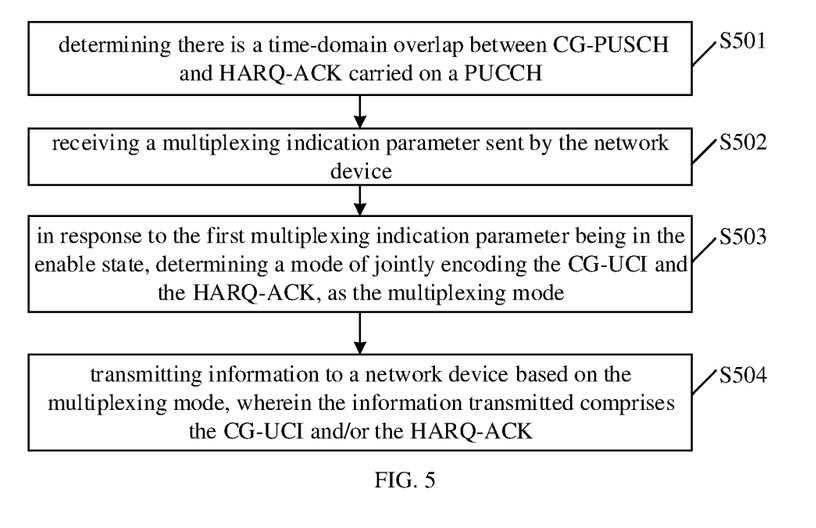
FIG. 5 is a flowchart of a method for multiplexing UCI according to another embodiment of the disclosure.

FIG. 5 is a flowchart of a method for multiplexing UCI according to an embodiment of the disclosure. The method is applied to a terminal device. The method includes the following steps.

At S501, it is determined that there is a time-domain overlap between CG-PUSCH and HARQ-ACK carried on a PUCCH.

Regarding the specific implementation of step S501, the implementation in any embodiment of the disclosure may be adopted, which may not be described again here.

At S502, a multiplexing indication parameter sent by the network device is received.

The multiplexing indication parameter is used to indicate whether to allow CG-UCI and HARQ-ACK with different priorities to be multiplexed. Optionally, the multiplexing indication parameter includes a first multiplexing indication parameter in the high layer signaling. The first multiplexing indication parameter may be an existing parameter in the high layer signaling, or may be a parameter newly added in the high layer signaling. For example, the high-layer signaling is an RRC signaling, and the CG-UCI Multiplexing parameter carried in the RRC signaling is served as the first multiplexing indication parameter.

At S503, in response to the first multiplexing indication parameter being in an enable state, a mode of joint encoding the CG-UCI and HARQ-ACK is determined as the multiplexing mode.

When the first multiplexing indication parameter is in the enable state, CG-UCI and HARQ-ACK are jointly encoded and carried in the CG-PUSCH, the CG-UCI and HARQ-ACK are transmitted. That is to say, when the first multiplexing indication parameter is in the enable state, the CG-UCI and HARQ-ACK are jointly encoded regardless of whether their priorities are the same priorities.

At S504, information is transmitted to a network device based on the multiplexing mode, in which the information transmitted includes the CG-UCI and/or the HARQ-ACK.

Regarding the specific implementation of step S504, the implementation in any embodiment of the disclosure may be adopted, which may not be described again here.

The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, and the appropriate multiplexing mode may be determined based on the multiplexing indication parameter and/or the priority of CG-PUSCH and the priority of HARQ-ACK carried on the PUCCH, which may thus ensure the transmission delay and reliability of UCI in the URLLC services.

Figure 6:
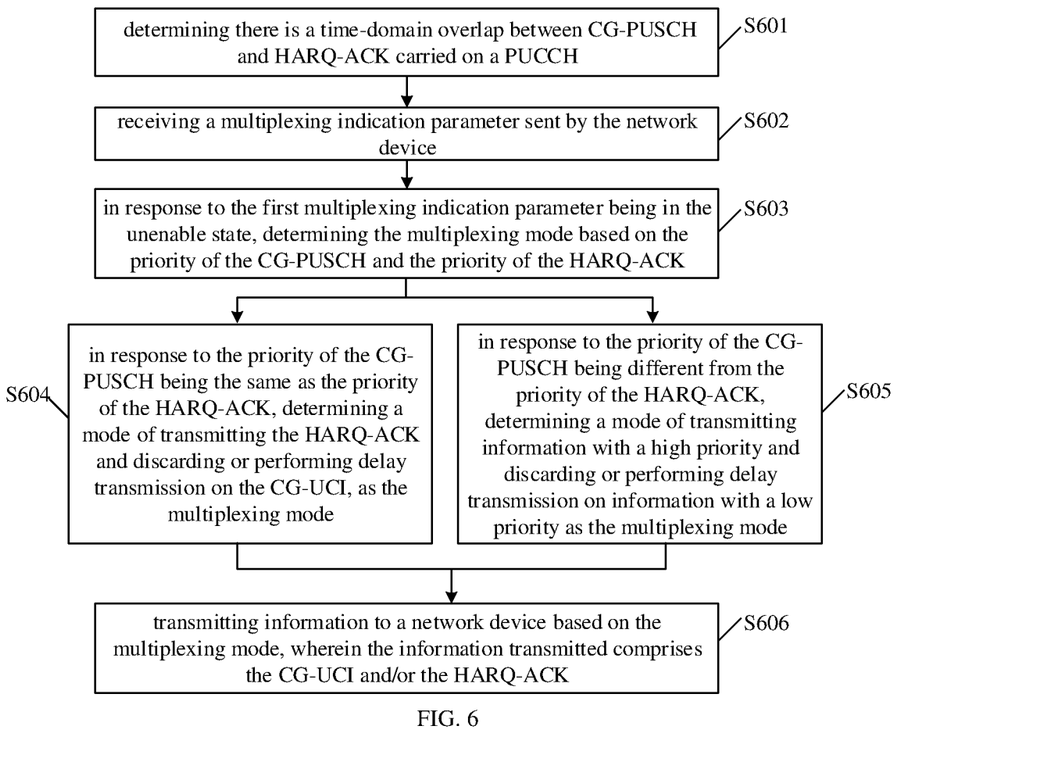
FIG. 6 is a flowchart of a method for multiplexing UCI according to another embodiment of the disclosure.

FIG. 6 is a flowchart of a method for multiplexing UCI according to an embodiment of the disclosure. The method is applied to a terminal device. The method includes the following steps.

At S601, it is determined that there is a time-domain overlap between CG-PUSCH and HARQ-ACK carried on a PUCCH.

Regarding the specific implementation of step S601, the implementation in any embodiment of the disclosure may be adopted, which may not be described again here.

At S602, a multiplexing indication parameter sent by the network device is received.

Regarding the specific implementation of step S602, the implementation in any embodiment of the disclosure may be adopted, which may not be described again here.

At S603, in response to the first multiplexing indication parameter being in an unenable state, the multiplexing mode is determined based on the priority of the CG-PUSCH and the priority of the HARQ-ACK.

When the first multiplexing indication parameter is in the unenable state, it indicates that CG-UCI and HARQ-ACK with different priorities are not allowed to be multiplexed. Further, the multiplexing mode may be determined based on the priority of the CG-PUSCH and the priority of the HARQ-ACK.

At S604, in response to the priority of the CG-PUSCH being the same as the priority of the HARQ-ACK, a mode of transmitting the HARQ-ACK and discarding or performing delay transmission on the CG-UCI is determined as the multiplexing mode.

In the embodiment of the disclosure, when the priority of the CG-PUSCH is the same as the priority of the HARQ-ACK, the HARQ-ACK may be carried in the PUCCH for transmission, and the CG-UCI may be discarded or delay transmission on the CG-UCI may be performed.

At S605, in response to the priority of the CG-PUSCH being different from the priority of the HARQ-ACK, a mode of transmitting information with a high priority and discarding or performing delay transmission on information with a low priority is determined as the multiplexing mode.

Optionally, the priority of CG-PUSCH is compared with the priority of HARQ-ACK. If the priority of HARQ-ACK is higher, a mode that the HARQ-ACK is transmitted while CG-UCI is discarded or delay transmission on the CG-UCI is performed is used as the multiplexing mode. If the priority of CG-UCI is higher, a mode that the CG-UCI is transmitted while the HARQ-ACK is discarded or delay transmission on the HARQ-ACK is used as the multiplexing mode.

At S606, information is transmitted to a network device based on the multiplexing mode, in which the information transmitted includes the CG-UCI and/or the HARQ-ACK.

Regarding the specific implementation of step S606, the implementation in any embodiment of the disclosure may be adopted, which may not be described again here.

The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, and the appropriate multiplexing mode may be determined based on the multiplexing indication parameter and/or the priority of CG-PUSCH and the priority of HARQ-ACK carried on the PUCCH, which may thus ensure the transmission delay and reliability of UCI in the URLLC services.

Figure 7:
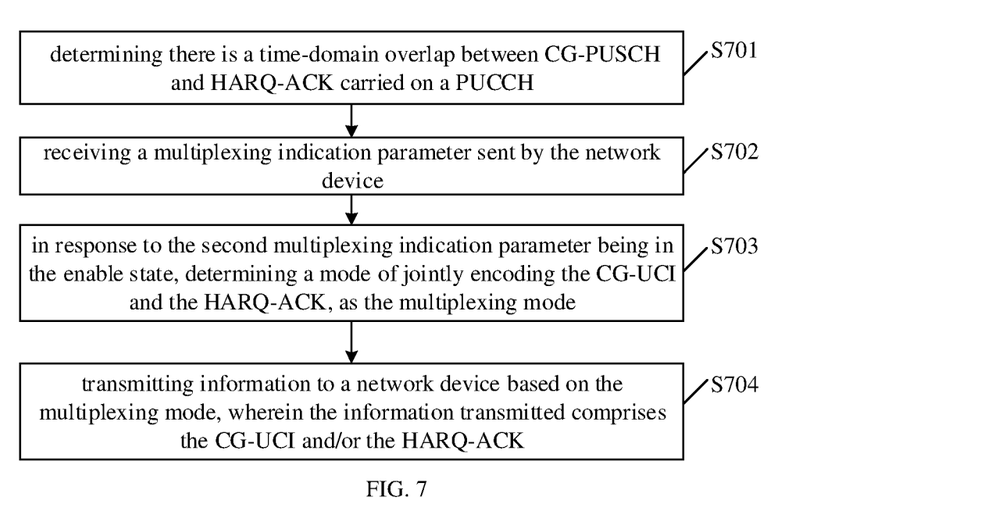
FIG. 7 is a flowchart of a method for multiplexing UCI according to another embodiment of the disclosure.

FIG. 7 is a flowchart of a method for multiplexing UCI according to an embodiment of the disclosure. The method is applied to a terminal device. The method includes the following steps.

At S701, it is determined that there is a time-domain overlap between CG-PUSCH and HARQ-ACK carried on a PUCCH.

Step S701 has been introduced in the above embodiment, which may not be described again here.

At S702, a multiplexing indication parameter sent by the network device is received.

The multiplexing indication parameter includes a first multiplexing indication parameter and a second multiplexing indication parameter. The first multiplexing indication parameter has been introduced in the above embodiment. A parameter newly added to the high layer signaling is used as the second multiplexing indication parameter. For example, the high-layer signaling is an RRC signaling, and the CG-UCI Multiplexing parameter carried in the RRC signaling is served as the first multiplexing indication parameter. Further, a parameter is newly added to the RRC signaling as the second multiplexing indication parameter. The second multiplexing indication parameter is used to indicate whether to allow multiplexing of the CG-UCI and HARQ-ACK with different priorities.

At S703, in response to the second multiplexing indication parameter being in an enable state, a mode of joint encoding the CG-UCI and HARQ-ACK is determined as the multiplexing mode.

If the second multiplexing indication parameter is in the enable state, the CG-UCI and HARQ-ACK are jointly encoded and carried in the CG-PUSCH, the CG-UCI and HARQ-ACK are transmitted. That is to say, when the second multiplexing indication parameter is in the enable state, the CG-UCI and HARQ-ACK are jointly encoded regardless of whether their priorities are the same priorities.

At S704, information is transmitted to a network device based on the multiplexing mode, in which the information transmitted includes the CG-UCI and/or the HARQ-ACK.

Regarding the specific implementation of step S704, the implementation in any embodiment of the disclosure may be adopted, which may not be described again here.

The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, which may thus ensure the transmission delay and reliability of UCI in the URLLC services.

Figure 8:
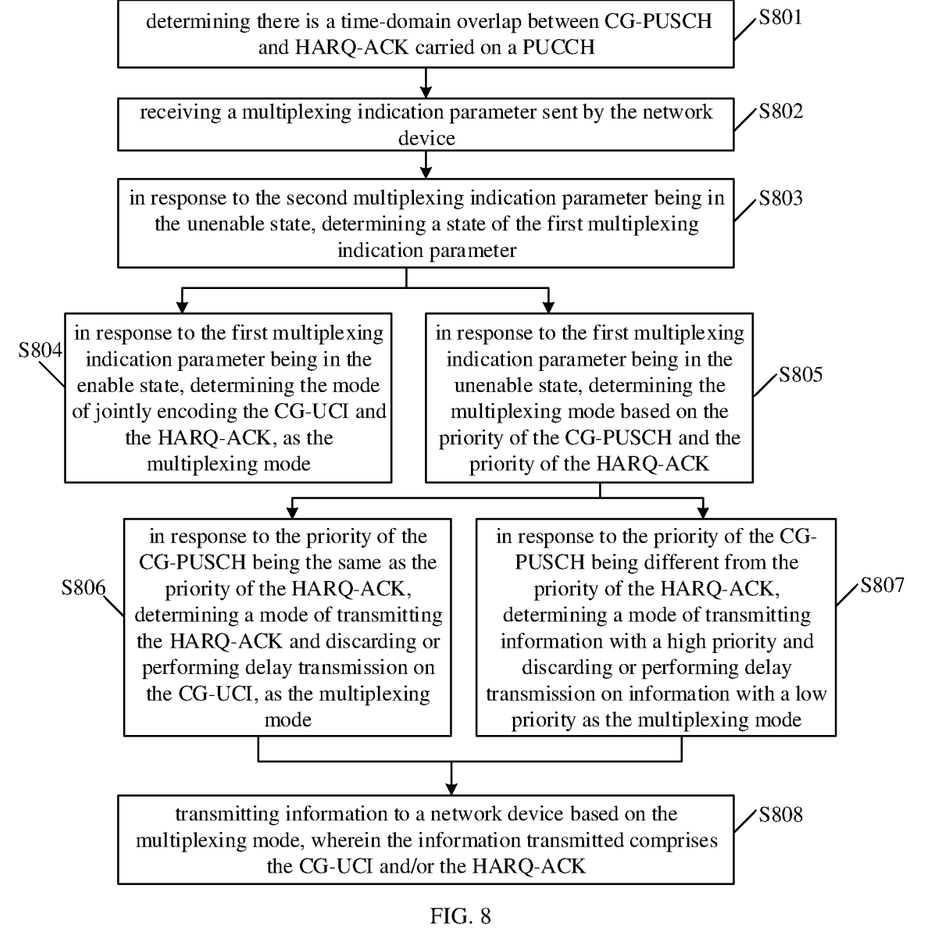
FIG. 8 is a flowchart of a method for multiplexing UCI according to another embodiment of the disclosure.

FIG. 8 is a flowchart of a method for multiplexing UCI according to an embodiment of the disclosure. The method is applied to a terminal device. The method includes the following steps.

At S801, it is determined that there is a time-domain overlap between CG-PUSCH and HARQ-ACK carried on a PUCCH.

Step S801 has been introduced in the above embodiment, which may not be described again here.

At S802, a multiplexing indication parameter sent by the network device is received.

Step S802 has been introduced in the above embodiment, which may not be described again here.

At S803, in response to the second multiplexing indication parameter being in an unenable state, a state of the first multiplexing indication parameter is determined.

If the second multiplexing indication parameter is in the unenable state, the multiplexing mode for the CG-UCI and HARQ-ACK cannot be determined only by the state of the second multiplexing indication parameter. At this time, it is necessary to determine the state of the first multiplexing indication parameter. The state of the first multiplexing indication parameter includes an enable state and an unenable state.

At S804, in response to the first multiplexing indication parameter being in the enable state, a mode of joint encoding the CG-UCI and HARQ-ACK is determined as the multiplexing mode.

At S805, in response to the first multiplexing indication parameter being in the unenable state, the multiplexing mode is determined based on the priority of the CG-PUSCH and the priority of the HARQ-ACK.

At S806, in response to the priority of the CG-PUSCH being the same as the priority of the HARQ-ACK, a mode of transmitting the HARQ-ACK and discarding or performing delay transmission on the CG-UCI is determined as the multiplexing mode.

At S807, in response to the priority of the CG-PUSCH being different from the priority of the HARQ-ACK, a mode of transmitting information with a high priority and discarding or performing delay transmission on information with a low priority is determined as the multiplexing mode.

At S808, information is transmitted to a network device based on the multiplexing mode, in which the information transmitted includes the CG-UCI and/or the HARQ-ACK.

Regarding the specific implementation of steps S804 to S808, the implementation in any embodiment of the disclosure may be adopted, which may not be described again here.

The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, which may thus ensure the transmission delay and reliability of UCI in the URLLC services.

Figure 9:
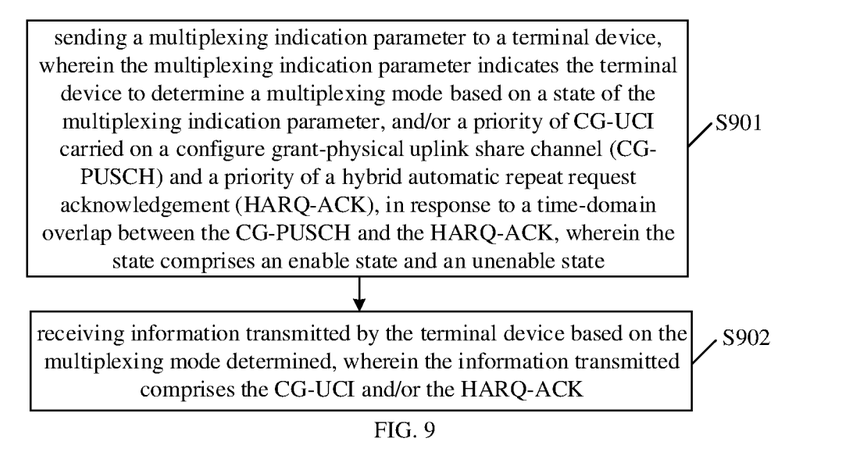
FIG. 9 is a flowchart of a method for multiplexing UCI according to another embodiment of the disclosure.

FIG. 9 is a flowchart of a method for multiplexing UCI according to an embodiment of the disclosure. The method is applied to a network device. As shown in FIG. 9, the method includes:

At S901, a multiplexing indication parameter is sent to a terminal device. The multiplexing indication parameter indicates the terminal device to determine a multiplexing mode based on a state of the multiplexing indication parameter, and/or a priority of CG-UCI carried on a configure grant-physical uplink share channel (CG-PUSCH) and a priority of a hybrid automatic repeat request acknowledgement (HARQ-ACK), in response to a time-domain overlap between the CG-PUSCH and the HARQ-ACK. The state includes an enable state and an unenable state.

For a detailed introduction to step S901, please refer to the relevant content described in the above embodiments, which may not be described again here.

At S902, information transmitted by the terminal device based on the determined multiplexing mode is received. The transmitted information includes CG-UCI and/or HARQ-ACK.

For a detailed introduction to step S902, please refer to the relevant content described in the above embodiments, which may not be described again this time.

Optionally, in response to the multiplexing mode being to joint encode the CG-UCI and HARQ-ACK, the received information is decoded to obtain the CG-UCI and HARQ-ACK.

CG-UCI and HARQ-ACK are jointly encoded and carried on the CG-PUSCH for transmission. When the terminal device receives the joint encoding, it may decode the encoding to obtain the original CG-UCI and HARQ-ACK information.

The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, which may thus ensure the transmission delay and reliability of UCI in the URLLC services.

Figure 10:
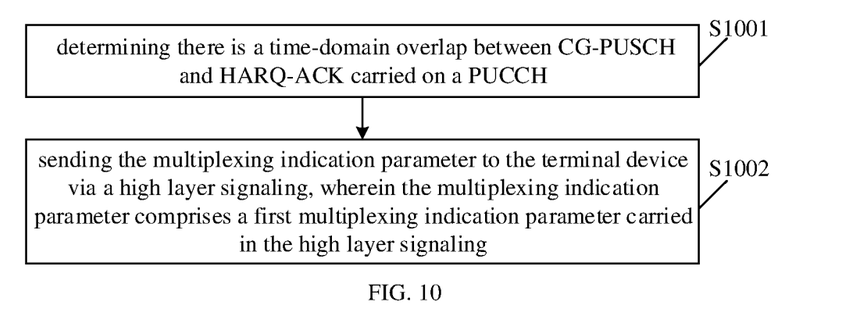
FIG. 10 is a flowchart of a method for multiplexing UCI according to another embodiment of the disclosure.

FIG. 10 is a flowchart of a method for multiplexing UCI according to an embodiment of the disclosure. The method is applied to a network device. As shown in FIG. 10, the method includes the following steps.

At S1001, it is determined that there is a time-domain overlap between CG-PUSCH and HARQ-ACK carried on a PUCCH.

For a detailed introduction to step S1001, please refer to the relevant content described in the above embodiment, which may not be described again here.

At S1002, a multiplexing indication parameter is sent to a terminal device via a high layer signaling. The multiplexing indication parameter includes a first multiplexing indication parameter carried in the high layer signaling.

For a detailed introduction to step S1002, please refer to the relevant content described in the above embodiment, which may not be described again here.

The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, which may thus ensure the transmission delay and reliability of UCI in the URLLC services.

Figure 11:
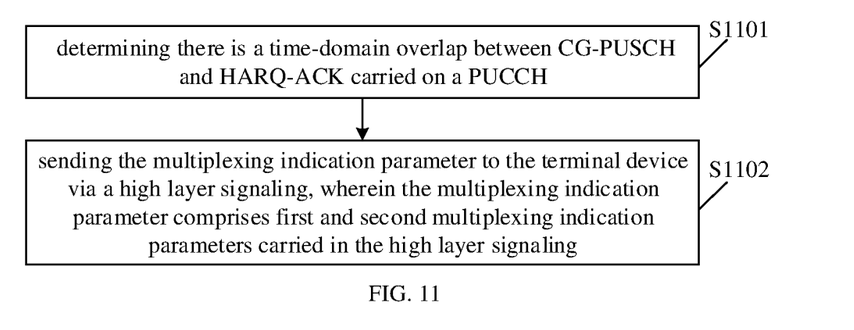
FIG. 11 is a flowchart of a method for multiplexing UCI according to another embodiment of the disclosure.

FIG. 11 is a flowchart of a method for multiplexing UCI according to an embodiment of the disclosure. The method is applied to a network device. As shown in FIG. 11, the method includes the following steps.

At S1101, it is determined that there is a time-domain overlap between CG-PUSCH and HARQ-ACK carried on a PUCCH.

For a detailed introduction to step S1101, please refer to the relevant content described in the above embodiment, which may not be described again here.

At S1102, a multiplexing indication parameter is sent to a terminal device via a high layer signaling. The multiplexing indication parameter includes a first multiplexing indication parameter and a second multiplexing indication parameter carried in the high layer signaling.

For a detailed introduction to step S1102, please refer to the relevant content described in the above embodiment, which may not be described again here.

The disclosure is applied to a scenario where there is a time-domain overlap between the CG-PUSCH and the HARQ-ACK carried on the PUCCH in the unlicensed band, multiplexing transmission of CG-PUSCH and HARQ-ACK in the unlicensed band may be achieved based on the priorities of CG-PUSCH and HARQ-ACK, which may thus ensure the transmission delay and reliability of UCI in the URLLC services.

In the above-mentioned embodiments according to the disclosure, the methods proposed in the disclosure are introduced from the perspectives of the network device and the terminal device. In order to implement each function in the methods proposed in the above embodiments of the disclosure, the network device and the terminal device may include hardware structures and software modules to implement the above functions in the form of the hardware structures, software modules, or hardware structures plus software modules. A certain function among the above functions may be executed in a hardware structure, a software module, or a hardware structure plus a software module.

The embodiment of the disclosure also provides a communication device. The communication device may be a terminal device (such as the terminal device in the aforementioned method embodiments), an apparatus in the terminal device, or a device that may be used in conjunction with the terminal device. Alternatively, the communication device may be a network device, an apparatus in a network device, or a device that may be used in conjunction with the network device.

Figure 12:
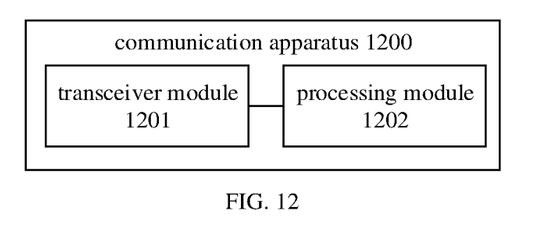
FIG. 12 is a diagram of an apparatus for multiplexing UCI according to an embodiment of the disclosure.

As shown in FIG. 12, it is a structural diagram of a communication apparatus according to an embodiment of the disclosure. The communication apparatus 1200 may include: a transceiver module 1201 and a processing module 1202.

The transceiver module 1201 may be configured to in response to a time-domain overlap between a CG-PUSCH and a HARQ-ACK carried on a PUCCH, determine based on a priority of the CG-PUSCH and a priority of the HARQ-ACK, a multiplexing mode for CG-UCI carried on the CG-PUSCH and the HARQ-ACK.

The processing module 1202 may be configured to transmit information to a network device based on the multiplexing mode, in which the transmitted information includes the CG-UCI and/or the HARQ-ACK.

The transceiver module 1201 is also configured to in response to the priority of the CG-PUSCH being different from the priority of the HARQ-ACK, determine a mode of transmitting information with a high priority and discarding or performing delay transmission on information with a low priority as the multiplexing mode.

The transceiver module 1201 is also used to receive a multiplexing indication parameter sent by the network device; and determine the multiplexing mode based on a state of the multiplexing indication parameter and/or the priority of the CG-PUSCH and the priority of the HARQ-ACK. The state of the multiplexing indication parameter includes an enable state and an unenable state.

Optionally, the transceiver module 1201 is also configured to in response to the first multiplexing indication parameter being in the enable state, determine a mode of jointly encoding the CG-UCI and the HARQ-ACK, as the multiplexing mode; and in response to the first multiplexing indication parameter being in the unenable state, determine the multiplexing mode based on the priority of the CG-PUSCH and the priority of the HARQ-ACK.

Optionally, the transceiver module 1201 is also configured to: in response to the second multiplexing indication parameter being in the enable state, determine a mode of jointly encoding the CG-UCI and the HARQ-ACK, as the multiplexing mode; in response to the second multiplexing indication parameter being in the unenable state, determine a state of the first multiplexing indication parameter; in response to the first multiplexing indication parameter being in the enable state, determine the mode of jointly encoding the CG-UCI and the HARQ-ACK, as the multiplexing mode; and in response to the first multiplexing indication parameter being in the unenable state, determine the multiplexing mode based on the priority of the CG-PUSCH and the priority of the HARQ-ACK.

Optionally, the transceiver module 1201 is also configured to: in response to the priority of the CG-PUSCH being the same as the priority of the HARQ-ACK, determine a mode of transmitting the HARQ-ACK and discarding or performing delay transmission on the CG-UCI, as the multiplexing mode; and in response to the priority of the CG-PUSCH being different from the priority of the HARQ-ACK, determine a mode of transmitting information with a high priority and discarding or performing delay transmission on information with a low priority as the multiplexing mode.

When the disclosure is applied to unlicensed band transmission, the appropriate multiplexing mode is determined based on the different priorities of CG-PUSCH and HARQ-ACK, which may ensure the transmission delay and reliability of UCI in the URLLC services.

When the communication apparatus 1200 is a network device, it includes a transceiver module 1201 and a processing module 1202. The transceiver module 1201 may be configured to send a multiplexing indication parameter to a terminal device. The multiplexing indication parameter indicates the terminal device to determine a multiplexing mode based on a state of the multiplexing indication parameter, or a priority of CG-UCI carried on a CG-PUSCH and a priority of a HARQ-ACK, in response to a time-domain overlap between the CG-PUSCH and the HARQ-ACK. The state includes an enable state and an unenable state.

The processing module 1202 may be configured to receive information transmitted by the terminal device based on the multiplexing mode determined. The transmitted information includes the CG-UCI and/or the HARQ-ACK.

Optionally, the transceiver module 1201 is also configured to send a multiplexing indication parameter to the terminal device via a high layer signaling. The multiplexing indication parameter includes a first multiplexing indication parameter carried in the high layer signaling.

Optionally, the transceiver module 1201 is also configured to send multiplexing indication parameters to the terminal device via a high layer signaling. The multiplexing indication parameters include a first multiplexing indication parameter and a second multiplexing indication parameter carried in the high layer signaling.

Optionally, the processing module 1202 is also configured to, in response to the multiplexing mode being a mode of jointly encoding the CG-UCI and the HARQ-ACK, decode the information received to obtain the CG-UCI and the HARQ-ACK.

When the disclosure is applied to unlicensed band transmission, the appropriate multiplexing mode is determined based on the different priorities of CG-PUSCH and HARQ-ACK, which may ensure the transmission delay and reliability of UCI in the URLLC services.

Figure 13:
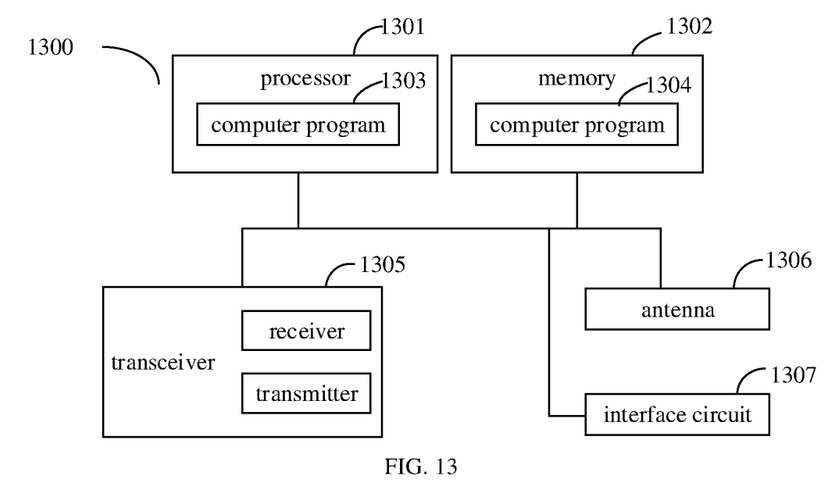
FIG. 13 is structural diagram of a communication device according to an embodiment of the disclosure.

FIG. 13 is structural diagram of another communication device 1300 according to an embodiment of the disclosure. The communication device 1300 may be a network device, a terminal device, a chip/chip system/processor that supports the network device to implement the above method, or a chip/chip system/processor that supports the terminal device to implement the above method. The device may be used to implement the method described in the above method embodiments. For details, please refer to the description in the above method embodiments.

The communication device 1300 may include one or more processors 1301. The processor 1301 may be a general-purpose processor or a special-purpose processor, etc. For example, it may be a baseband processor or a central processing unit. The baseband processor may be used to process communication protocols and communication data. The central processing unit may be used to control the communication device (such as a base station, a baseband chip, a terminal device, a terminal device chip, a DU or a CU, etc.) and execute computer programs, processing data of the computer programs.

Optionally, the communication device 1300 may also include one or more memories, 1302 on which a computer program 1304 may be stored. When the computer program 1304 is executed by the processor 1301, so that the communication device 1300 is caused to carry out the method described in the above method embodiments. Optionally, data may also be stored in the memory 1302. The communication device 1300 and the memory 1302 may be provided separately or integrated together.

Optionally, the communication device 1300 may also include a transceiver 1305 and an antenna 1306. The transceiver 1305 may be called a transceiver unit, a transceiving machine, or a transceiver circuit, etc., and is used to implement transceiving functions. The transceiver 1305 may include a receiver and a transmitter. The receiver may be called a receiving machine or a receiving circuit, etc., and is used to implement the receiving function. The transmitter may be called a transmitting machine or a transmitting circuit, etc., and is used to implement the transmitting function.

Optionally, the communication device 1300 may also include one or more interface circuits 1307. The interface circuit 1307 is used to receive code instructions and transmit them to the processor. The code instructions are executed by the processor 1301, so that the communication device 1300 is caused to carry out the method described in the above method embodiments.

The communication device 1300 may be a terminal device. The processor 1301 is used to perform the step S901 in FIG. 9, the step S1001 in FIG. 10, the step S1101 in FIG. 11, etc. The transceiver 1305 is used to perform the step S202 in FIG. 2, the step S303 in FIG. 3, the step S404 in FIG. 4, the step S505 in FIG. 5, etc.

The communication device 1300 may be a network device. The transceiver 1305 is used to perform the step S202 in FIG. 2, the step S303 in FIG. 3, the step S404 in FIG. 4, etc. The processor 1301 is used to perform the step S201 in FIG. 2, the step S301 in FIG. 3, the step S401 in FIG. 4, etc.

In an implementation, a transceiver for implementing receiving and transmitting functions may be included in the processor 1301. For example, the transceiver may be a transceiver circuit, an interface, or an interface circuit. The transceiver circuit, interface or interface circuit used to implement the receiving and transmitting functions may be separate or integrated together. The above-mentioned transceiver circuit, interface or interface circuit may be used for reading and writing codes/data. Alternatively, the above-mentioned transceiver circuit, interface or interface circuit may be used for signal transmission or transfer.

In an implementation, the processor 1301 may store a computer program 1303, and the computer program 1303 runs on the processor 1301, causing the communication device 1300 to carry out the method described in the above method embodiments. The computer program 1303 may be embedded in the processor 1301, in which case the processor 1301 may be implemented in hardware.

In an implementation, the communication device 1300 may include a circuit, and the circuit may implement transmitting or receiving or communicating functions in the foregoing method embodiments. The processor and transceiver described in this disclosure may be implemented in an integrated circuit (IC), an analog IC, a radio frequency integrated circuit (RFIC), a mixed signal IC, an application specific integrated circuit (ASIC), a printed circuit board (PCB), electronic equipment, etc. The processor and transceiver may also be manufactured using various IC process technologies, such as a complementary metal oxide semiconductor (CMOS), a nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be a network device or a terminal device (such as the network device or terminal device in the foregoing method embodiments), but the scope of the communication device described in the disclosure is not limited. The structure of the communication device may be not limited by FIG. 13. The communication device may be a stand-alone device or may be part of a larger device. For example, the communication device may be:

(1) an independent integrated circuit IC, or a chip, or a chip system or a subsystem;
(2) a collection of one or more ICs. Optionally, the IC collection may also include storage components for storing data and computer programs;
(3) ASIC, such as modem;
(4) modules that may be embedded in other devices;
(5) a receiver, a terminal device, an intelligent terminal device, a cellular phone, a wireless device, a handheld device, a mobile unit, a vehicle-mounted device, a network device, a cloud device, an artificial intelligence device, etc.;
(6) Others, etc.

Figure 14:
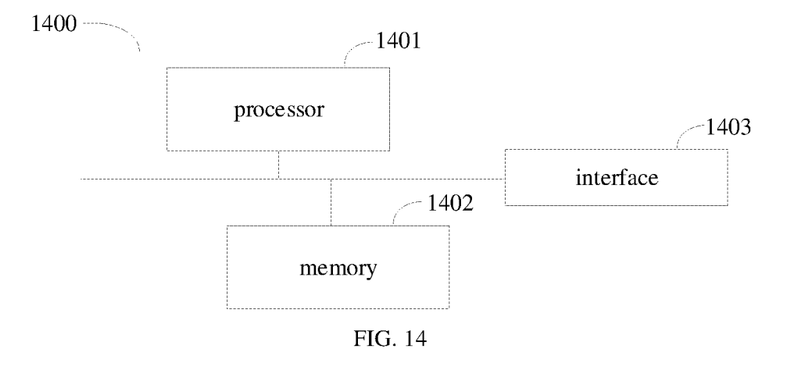
FIG. 14 is a structural diagram of a chip according to an embodiment of the disclosure.

For the case where the communication device may be a chip or a system on a chip, please see the structural diagram of the chip shown in FIG. 14, which include a processor 1401 and an interface 1402. The number of processors 1401 may be one or more, and the number of interfaces 1402 may be multiple.

For the case where the chip is used to implement the functions of the terminal device in the embodiments of the disclosure, the interface 1402 is used to perform the step S901 in FIG. 9, the step S1001 in FIG. 10, the step S1101 in FIG. 11, etc.

For the case where the chip is used to implement the functions of the network device in the embodiment of the disclosure, the interface 1402 is used to perform the step S202 in FIG. 2, the step S303 in FIG. 3, the step S404 in FIG. 4, etc.

Optionally, the chip also includes a memory 1403, which is used to store necessary computer programs and data.

Those skilled in the art may also understand that the various illustrative logical blocks and steps listed in the embodiments of the disclosure may be implemented by electronic hardware, computer software, or their combination. Whether such functionality is implemented in hardware or software depends on a specific application and overall system design requirements. Those skilled in the art may use various methods to implement the described functions for each specific application, but such implementation should not be understood as going beyond the protection scope of the embodiments of the disclosure.

The embodiments of the disclosure also provide an adjustment system with a maximum number of transmission layers, which includes a communication apparatus serving as a terminal device (such as the terminal device in the foregoing method embodiments) and a communication apparatus serving as a network device in the embodiment of FIG. 12. Alternatively, the system includes a communication apparatus serving as a terminal device (such as the terminal device in the foregoing method embodiments) and a communication apparatus serving as a network device in the embodiment of FIG. 13.

The disclosure also provides a readable storage medium on which instructions are stored, and when the instructions are executed by a computer, the functions of any one of the above method embodiments are implemented.

The disclosure also provides a computer program product, which implements the functions of any one of the above method embodiments when executed by a computer.

In the above embodiments, it may be implemented in whole or in part by software, hardware, firmware, or any combination. When implemented in software, it may be implemented in whole or in part in the form of a computer program product. The computer program product includes one or more computer programs. When the computer program is loaded and executed on a computer, the processes or functions described in the embodiments of the disclosure are generated in whole or in part. The computer may be a general-purpose computer, a special-purpose computer, a computer network, or other programmable device. The computer program may be stored in or transferred from one computer-readable storage medium to another. For example, the computer program may be transferred from a website, a computer, a server, or a data center to another website, another computer, another server or another data center through a wired means (such as a coaxial cable, an optical fiber, a digital subscriber line (DSL)) or a wireless means (such as infrared, wireless, microwave, etc.). The computer-readable storage medium may be any available medium that may be accessed by a computer or a data storage device such as a server, a data center, etc. that contains one or more available media integrated. The available media may be magnetic media (e.g., a floppy disk, a hard disk, a tape), optical media (e.g., a digital video disc (DVD)), or semi-conductor media (e.g., a solid state disk (SSD)) etc.

Those skilled in the art may understand that the first, second, and other numerical numbers involved in the disclosure are only for convenience of description and are not used to limit the scope of the embodiments of the disclosure and also indicate the order.

The term "at least one" in the disclosure can also be described as one or more, and "a plurality of" may be two, three, four or more, which is not limited by the disclosure. In the embodiments of the disclosure, for a technical feature, the technical feature is distinguished by "first" "second", "third", "A", "B", "C" and "D", etc. The technical features described in "first", "second", "third", "A", "B", "C" and "D" are in no particular order or size sequence.

The corresponding relationships shown in each table in the disclosure may be configured or predefined. The values of the information in each table are only examples and may be configured as other values, which is not limited by the disclosure. When configuring the correspondence between information and each parameter, it is not necessarily required to configure all the correspondences shown in each table. For example, in the table in the disclosure, the corresponding relationships shown in some rows may not be configured. For another example, appropriate deformation adjustments may be made based on the above tables, such as splitting, merging, etc. The names of the parameters shown in the titles of the above tables may also be other names that may be understood by the communication device, and the values or expressions of the parameters may also be other values or expressions that may be understood by the communication device. When implementing the above tables, other data structures may also be used, such as arrays, queues, containers, stacks, linear lists, pointers, linked lists, trees, graphs, structures, classes, heaps, hash tables, etc.

Predefinition in the disclosure may be understood as definition, pre-definition, storage, pre-storage, pre-negotiation, pre-configuration, solidification, or pre-burning.

Those skilled in the art may be aware that the units and algorithm steps of each example described in conjunction with the embodiments disclosed herein may be implemented with electronic hardware, or a combination of computer software and electronic hardware. Whether these functions are executed in hardware or software depends on a specific application and design constraints of the technical solution. Those skilled in the art may implement the described functionality using different methods for each specific application, but such implementations should not be considered to go beyond the scope of the disclosure.

Those skilled in the art may clearly understand that for the convenience and simplicity of description, the specific working processes of the systems, devices and units described above may be referred to the corresponding processes in the foregoing method embodiments, which will not be repeated here.

The above are only specific embodiments of the disclosure, but the protection scope of the disclosure is not limited. Any person in the technical field may easily think of changes or substitutions within the technical scope disclosed in the disclosure, which should be covered by the protection scope of the disclosure. Therefore, the protection scope of the disclosure should be determined by the protection scope of the claims.

What is claimed is:

1. A method for multiplexing uplink control information (UCI) for unlicensed band transmission, performed by a terminal device, the method comprising:
   in response to a time-domain overlap between a configure grant-physical uplink share channel (CG-PUSCH) and a hybrid automatic repeat request acknowledgement (HARQ-ACK) carried on a physical uplink control channel (PUCCH), determining, based on a priority of the CG-PUSCH and a priority of the HARQ-ACK, a multiplexing mode for CG-UCI carried on the CG-PUSCH and the HARQ-ACK; and
   transmitting information to a network device based on the multiplexing mode, wherein the information transmitted comprises at least one of the CG-UCI or the HARQ-ACK.

2. The method according to claim 1, further comprising:
   in response to the priority of the CG-PUSCH being different from the priority of the HARQ-ACK, determining a mode of transmitting information with a high priority and discarding or performing delay transmission on information with a low priority as the multiplexing mode.

3. The method according to claim 1, further comprising:
receiving a multiplexing indication parameter sent by the network device; and
determining the multiplexing mode based on at least one of a state of the multiplexing indication parameter, or the priority of the CG-PUSCH and the priority of the HARQ-ACK, wherein the state of the multiplexing indication parameter comprises an enable state and an unenable state.

4. The method according to claim 3, wherein the multiplexing indication parameter comprises a first multiplexing indication parameter carried in a high layer signaling, and determining the multiplexing mode comprises:
in response to the first multiplexing indication parameter being in the enable state, determining a mode of jointly encoding the CG-UCI and the HARQ-ACK, as the multiplexing mode; and
in response to the first multiplexing indication parameter being in the unenable state, determining the multiplexing mode based on the priority of the CG-PUSCH and the priority of the HARQ-ACK.

5. The method according to claim 3, wherein the multiplexing indication parameter comprises a first multiplexing indication parameter and a second multiplexing indication parameter carried in a high layer signaling, and determining the multiplexing mode comprises:
in response to the second multiplexing indication parameter being in the enable state, determining a mode of jointly encoding the CG-UCI and the HARQ-ACK, as the multiplexing mode;
in response to the second multiplexing indication parameter being in the unenable state, determining a state of the first multiplexing indication parameter;
in response to the first multiplexing indication parameter being in the enable state, determining the mode of jointly encoding the CG-UCI and the HARQ-ACK, as the multiplexing mode; and
in response to the first multiplexing indication parameter being in the unenable state, determining the multiplexing mode based on the priority of the CG-PUSCH and the priority of the HARQ-ACK.

6. The method according to claim 4, wherein determining the multiplexing mode based on the priority of the CG-PUSCH and the priority of the HARQ-ACK comprises:
in response to the priority of the CG-PUSCH being the same as the priority of the HARQ-ACK, determining a mode of transmitting the HARQ-ACK and discarding or performing delay transmission on the CG-UCI, as the multiplexing mode; and
in response to the priority of the CG-PUSCH being different from the priority of the HARQ-ACK, determining a mode of transmitting information with a high priority and discarding or performing delay transmission on information with a low priority as the multiplexing mode.

7. A method for multiplexing uplink control information (UCI) for unlicensed band transmission, performed by a network device, the method comprising:
sending a multiplexing indication parameter to a terminal device, wherein the multiplexing indication parameter indicates the terminal device to determine a multiplexing mode based on at least one of a state of the multiplexing indication parameter, or a priority of CG-UCI carried on a configure grant-physical uplink share channel (CG-PUSCH) and a priority of a hybrid automatic repeat request acknowledgement (HARQ-ACK), in response to a time-domain overlap between the CG-PUSCH and the HARQ-ACK, wherein the state comprises an enable state and an unenable state; and
receiving information transmitted by the terminal device based on the multiplexing mode determined, wherein the information transmitted comprises at least one of the CG-UCI or the HARQ-ACK.

8. The method according to claim 7, further comprising:
sending the multiplexing indication parameter to the terminal device via a high layer signaling, wherein the multiplexing indication parameter comprises a first multiplexing indication parameter carried in the high layer signaling.

9. The method according to claim 7, further comprising:
sending the multiplexing indication parameter to the terminal device via a high layer signaling, wherein the multiplexing indication parameter comprises a first multiplexing indication parameter and a second multiplexing indication parameter carried in the high layer signaling.

10. The method according to claim 7, further comprising:
in response to the multiplexing mode being a mode of jointly encoding the CG-UCI and the HARQ-ACK, decoding the information received to obtain the CG-UCI and the HARQ-ACK.

11. A terminal device, comprising:
a processor; and
a memory for storing a computer program executable by the processor,
wherein the processor is configured to:
in response to a time-domain overlap between a configure grant-physical uplink share channel (CG-PUSCH) and a hybrid automatic repeat request acknowledgement (HARQ-ACK) carried on a physical uplink control channel (PUCCH), determine, based on a priority of the CG-PUSCH and a priority of the HARQ-ACK, a multiplexing mode for multiplexing CG-uplink control information (CG-UCI) carried on the CG-PUSCH and the HARQ-ACK; and
transmit information to a network device based on the multiplexing mode, wherein the information transmitted comprises at least one of the CG-UCI or the HARQ-ACK.

12. A network device, comprising:
a processor; and
a memory for storing a computer program executable by the processor,
wherein the processor is configured to perform the method according to claim 7.

13. A communication device, comprising:
an interface circuit for receiving and transmitting code instructions to a processor; and
the processor for executing the code instructions to perform the method according to claim 1.

14. A device for receiving HARQ feedback information, comprising:
an interface circuit for receiving and transmitting code instructions to a processor; and
the processor for executing the code instructions to perform the method according to claim 7.

15. A non-transitory computer-readable storage medium storing instructions, wherein when the instructions are executed, the method according to claim 1 is performed.

16. A non-transitory computer-readable storage medium storing instructions, wherein when the instructions are executed, the method according to claim 7 is performed.

17. The method according to claim 5, wherein determining the multiplexing mode based on the priority of the CG-PUSCH and the priority of the HARQ-ACK comprises:
- in response to the priority of the CG-PUSCH being the same as the priority of the HARQ-ACK, determining a mode of transmitting the HARQ-ACK and discarding or performing delay transmission on the CG-UCI, as the multiplexing mode; and
- in response to the priority of the CG-PUSCH being different from the priority of the HARQ-ACK, determining a mode of transmitting information with a high priority and discarding or performing delay transmission on information with a low priority as the multiplexing mode.

\* \* \* \* \*